United States Patent
Treville et al.

(10) Patent No.: US 11,076,535 B2
(45) Date of Patent: Aug. 3, 2021

(54) SYSTEMS AND METHODS FOR INDOOR PLANT CULTIVATION, STORAGE, AND PEST CONTROL

(71) Applicants: Louis-Christophe Treville, Montreal (CA); Philip Treville, Montreal (CA)

(72) Inventors: Louis-Christophe Treville, Montreal (CA); Philip Treville, Montreal (CA)

(73) Assignee: STOREXCA CONTROLLED ATMOSPHERE INC.

( * ) Notice: Subject to any disclaimer, the term of this patent is extended or adjusted under 35 U.S.C. 154(b) by 244 days.

(21) Appl. No.: 15/820,432

(22) Filed: Nov. 22, 2017

(65) Prior Publication Data
US 2018/0325036 A1 Nov. 15, 2018

Related U.S. Application Data

(60) Provisional application No. 62/424,824, filed on Nov. 21, 2016.

(51) Int. Cl.
*A01G 7/02* (2006.01)
*A01N 59/04* (2006.01)
*A01M 13/00* (2006.01)

(52) U.S. Cl.
CPC .............. *A01G 7/02* (2013.01); *A01M 13/00* (2013.01); *A01M 13/003* (2013.01); *A01N 59/04* (2013.01)

(58) Field of Classification Search
CPC ......... A01G 7/02; A01N 59/04; A01M 13/00; A01M 13/003
See application file for complete search history.

(56) References Cited

U.S. PATENT DOCUMENTS

| | | | | |
|---|---|---|---|---|
| 5,735,076 A | * | 4/1998 | Masui | A01G 7/06 47/48.5 |
| 7,765,733 B1 | * | 8/2010 | Liu | A23B 7/148 43/124 |
| 8,877,274 B2 | * | 11/2014 | Bell | A23L 3/363 426/418 |
| 10,426,177 B2 | * | 10/2019 | Goldman | A23L 3/3418 |
| 2006/0269438 A1 | * | 11/2006 | Lagunas-Solar | A01M 1/226 422/1 |
| 2018/0325036 A1 | * | 11/2018 | Treville | A01M 13/003 |
| 2019/0281777 A1 | * | 9/2019 | Korzilius | A01G 7/02 |

FOREIGN PATENT DOCUMENTS

EP 2177117 A1 * 4/2010 ........... A23L 3/3445

OTHER PUBLICATIONS

NPL Potential of controlled atmospheres for postharvest insect disinfestation of fruits and vegetables. 1992 (Year: 1992).*
NPL Modified Atmosphere Treatments as a Potential Disinfestation Technique for Arthropod Pests in Greenhouses. May 2001 (Year: 2001).*
NPL Can CO2 Kill Insects and Garden Pests? (Year: 2013).*
NPL Rosebud Magazine Files (Year: 2014).*

* cited by examiner

*Primary Examiner* — Richard G Davis
(74) *Attorney, Agent, or Firm* — Neil Juneja

(57) ABSTRACT

The present invention provides an effective pest control solution for indoor cannabis applications. The interior atmosphere is controlled to expose the live cannabis plants or post-harvest plant products to low oxygen levels (higher than 1% but lower than ambient air) and high carbon dioxide levels for one or more periods of less than 48 hours. This combination is effective to prevent or eliminate pests without harming the plants.

11 Claims, No Drawings

SYSTEMS AND METHODS FOR INDOOR PLANT CULTIVATION, STORAGE, AND PEST CONTROL

CROSS-REFERENCE TO RELATED APPLICATION

This application claims the benefit of U.S. Provisional Application No. 62/424,824, filed Nov. 21, 2016, which is hereby incorporated in its entirety by reference.

FIELD OF THE INVENTION

The present invention relates to indoor cultivation of plants such as cannabis.

BACKGROUND OF THE INVENTION

The invention described herein comprises an indoor space for growing, harvesting, curing or storing plants such as cannabis. The indoor space can be a building, a room or multiple rooms. Atmospheric variables including light intensity, temperature, humidity, ethylene content, oxygen ($O_2$) pressure, nitrogen ($N_2$) pressure or carbon dioxide ($CO_2$) pressure can be adjusted inside the indoor space as needed to promote plant growth, facilitate drying and curing of harvested plant material, eliminate pests, prevent pests, or prevent fires.

With the increasing legalization of cannabis for both medical and recreational use, large-scale commercial production facilities have been built to meet the supply needs of a legal cannabis market. With these large indoor cultivation facilities come enormous pest problems. As the industry is still new, few pesticide options exist that are widely accepted as safe and effective against cannabis-specific pests. Growers have turned to products that are currently available on the market, many cleared for use only on ornamental plants, not safe for human consumption, or ineffective against persistent pests such as thrips and spider mites. There is a clear need for pest control solutions that address the needs of cannabis growers, preferably without the use of pesticides.

Systems and methods for controlling atmospheric variables in an indoor space, including levels of oxygen, nitrogen and carbon dioxide in the interior atmosphere are well known. See, e.g., U.S. Pat. Nos. 5,791,236; 6,092,430; 8,551,215; 6,460,352. These systems are commonly used for storage and transportation of agricultural commodities. Exposure of certain commodities to low levels of oxygen, or high levels of carbon dioxide has been shown to be an effective treatment for pests. For example, U.S. Pat. No. 7,765,733 describes an ultra-low oxygen treatment for post-harvest pest control on agriculture products. This system is not suitable for cannabis applications, however, because it requires extremely low temperatures or extremely low levels of oxygen (under 1%). Extremely low temperatures and oxygen levels could kill or hinder the growth of live cannabis plants. Moreover, to achieve maximum effectiveness the system requires exposure to extremely low levels of oxygen for several days. These oxygen levels are lethal to humans. Most indoor cannabis growing facilities require regular maintenance and human access to the facilities, and cannot be inaccessible for longer than 24-48 hours.

There is a need for a pesticide-free pest control solution for indoor cannabis cultivation that does not require extremely temperatures or ultra-low oxygen conditions, and that does not render the facilities inaccessible for several days.

BRIEF SUMMARY OF THE INVENTION

The present invention provides an effective pest control solution for indoor cannabis applications. The interior atmosphere is controlled to expose the live cannabis plants or post-harvest plant products to low oxygen levels (higher than 1% but lower than ambient air) and high carbon dioxide levels for one or more periods of less than 48 hours. This combination is effective to prevent or eliminate pests without harming the plants.

The present invention now will be described more fully herein. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The indoor space used herein is airtight or substantially airtight so as to allow creating a controlled-atmosphere environment inside. In one embodiment the maximum air leak tolerance inside the room is 0.15 cm2 per 100 m3 of volume of air. Any known system or method for controlling atmospheric variables in an indoor space, including levels of oxygen, nitrogen and carbon dioxide in the interior atmosphere may be used with the present invention. In one embodiment, sensors are located in the room to measure temperature, relative humidity, ethylene content, and $O_2$, $N_2$ or $CO_2$ pressure. Data from the sensors is provided to a computer control system for adjusting each of the sensed variables by controlling atmosphere-control equipment.

The system can be used to treat an infestation of insects or mold affecting plants inside the room. This could be done in the rooms the plants are in normally (such as grow rooms, veg rooms, etc.) or a special room (i.e., a decontamination chamber) could be designated for treatment where plants can be brought to in order to treat them. The system also can be used to prevent any infestation from developing by periodically performing treatments in the rooms the plants are in normally.

A treatment is performed by executing a recipe of target oxygen, carbon dioxide, nitrogen, for a predetermined minimum period of time. Different recipes are developed for different treatments of different pests. An example of a recipe is: 5% $O_2$, 5% $CO_2$, 90% $N_2$, 10% RH, 10 degrees Celsius during an hour of time. During the treatment with extreme atmospheric conditions (e.g., extremely low oxygen pressure) no human or other living breathing species should be in the room as the conditions achieved in atmosphere are lethal.

Treatment recipes generally require plants to be watered regularly according to their normal schedule. In addition, treatments may be applied with lighting OFF (i.e., no supplemental LED or HPS lighting is turned ON during treatment) for at least a portion of the treatment duration. This allows for more accurate measurement and adjustment of oxygen and carbon dioxide levels, since these levels are affected by photosynthesis.

Effective recipes for pest control and prevention include at least one treatment of at least 12-hours with $O_2$ in the range 0.5-5%, $CO_2$ in the range 15-25%, and $N_2$ in the range 70-85%. An effective recipe for thrips and spider mites includes at least one 24-48 hour treatment with carbon dioxide at 40%-80% and oxygen at around 12%, with nitrogen comprising the greater remainder of the interior atmosphere. For live plants, different "grow" recipes are applied when not performing a pest prevention treatment.

What is claimed is:

1. A method of controlling pests in an airtight indoor space, the method comprising:
   maintaining, during a consecutive period of treatment, a controlled atmosphere inside the airtight indoor space comprising a carbon dioxide concentration of 5%, an oxygen concentration of 5%, and a nitrogen concentration of 90%;
   wherein the relative humidity of atmosphere inside the airtight indoor space is 10% during the treatment, and wherein the consecutive period of treatment is 1 hour.

2. A method of controlling pests in an airtight indoor space, the method comprising:
   maintaining, during a consecutive period of treatment, a controlled atmosphere inside the airtight indoor space comprising a carbon dioxide concentration of 5%, an oxygen concentration of 5%, and a nitrogen concentration of 90%;
   wherein the temperature of the atmosphere inside the airtight indoor space is 10° C. during the treatment, and wherein the consecutive period of treatment is 1 hour.

3. A method of controlling pests in an airtight indoor space containing living plants, the method comprising:
   maintaining, during a consecutive period of treatment, a controlled atmosphere inside the airtight indoor space comprising a carbon dioxide concentration between 20% and 40% and an oxygen concentration between 0.5% and 5%, a remainder of which being nitrogen,
   wherein the consecutive period of treatment is between 12 and 24 hours.

4. The method of claim 3, wherein the oxygen concentration is greater than 1%.

5. The method of claim 3, wherein the nitrogen concentration is about 70%.

6. The method of claim 3, wherein the carbon dioxide concentration is about 25%.

7. The method of claim 3, further comprising turning on a controllable light source within the airtight indoor space during at least a portion of the consecutive period of treatment.

8. The method of claim 3, further comprising turning off a controllable light source within the airtight indoor space during at least a portion of the consecutive period of treatment.

9. The method of claim 3, wherein the living plants are cannabis plants.

10. The method of claim 3, wherein a maximum air leak tolerance inside the airtight indoor space is 0.15 cm$^2$ per 100 m$^3$ of volume of air.

11. The method of claim 3, further comprising watering regularly the plants during the period of treatment.

* * * * *